June 24, 1952  R. S. BLACKSHEAR  2,601,360
AUTOMATIC SPATULA
Filed Nov. 10, 1950  2 SHEETS—SHEET 1
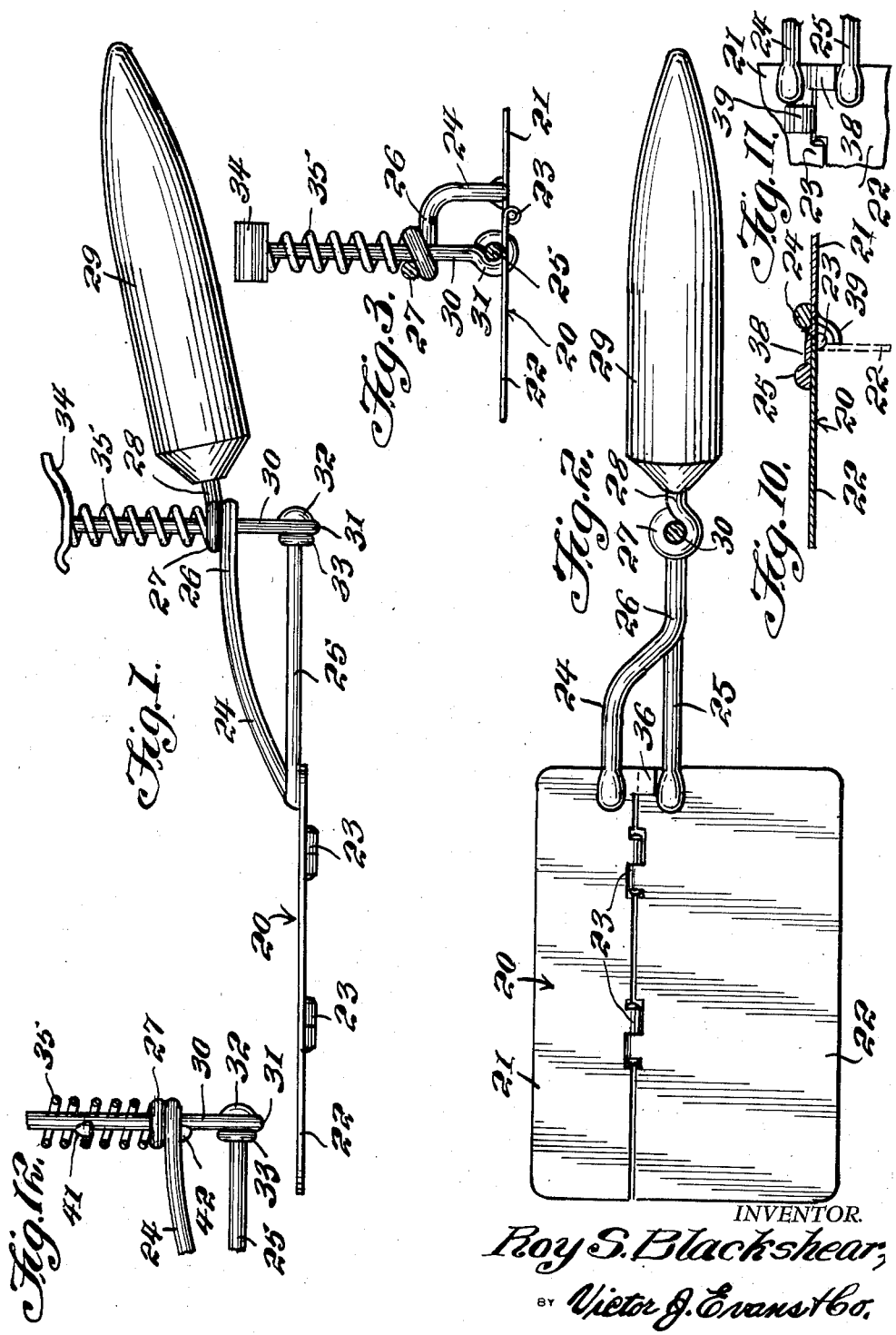
INVENTOR.
Roy S. Blackshear,
BY Victor J. Evans & Co.
ATTORNEYS June 24, 1952     R. S. BLACKSHEAR     2,601,360
AUTOMATIC SPATULA
Filed Nov. 10, 1950     2 SHEETS—SHEET 2
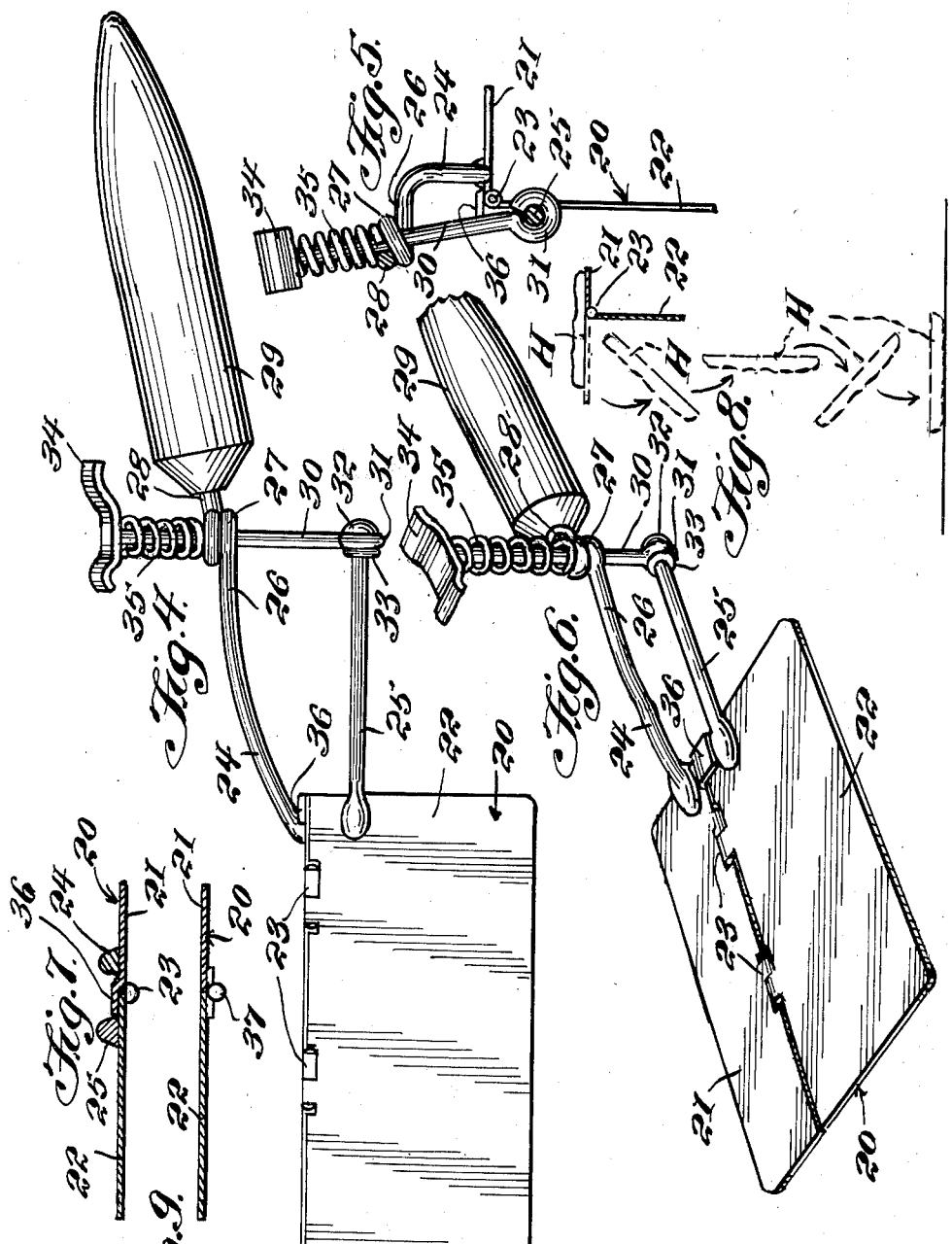
INVENTOR.
*Roy S. Blackshear,*
BY *Victor J. Evans & Co.*
ATTORNEYS Patented June 24, 1952

2,601,360

UNITED STATES PATENT OFFICE 2,601,360

AUTOMATIC SPATULA

Roy S. Blackshear, Hilo, Territory of Hawaii

Application November 10, 1950, Serial No. 195,073

6 Claims. (Cl. 294—8)

This invention relates to a culinary implement or utensil, and more particularly to a spatula or cake turner.

The object of the invention is to provide a spatula that will enable the user to readily turn articles of food, such as pancakes, hamburgers, eggs and the like.

Another object of the invention is to provide a spatula for handling and turning over articles of food, such as pancakes, hamburgers, eggs, French toast, the spatula including a stationary part and a movable part hingedly connected thereto, the spatula being easy to use, whereby the articles of food can be flipped over accurately and quickly.

A further object of the invention is to provide a spatula which is extremely simple and inexpensive to manufacture.

Other objects and advantages will be apparent during the course of the following description.

In the accompanying drawings forming a part of this application and in which like numerals are used to designate like parts throughout the several views:

Figure 1 is a side elevational view of the spatula constructed according to the present invention;

Figure 2 is a top plan view of the spatula;

Figure 3 is a vertical transverse sectional view taken through the spatula looking from the handle;

Figure 4 is a side elevational view of the spatula, with the movable part in lowered position;

Figure 5 is a view similar to Figure 3, but with the parts in the lowered position, as shown in Figure 4;

Figure 6 is a perspective view of the spatula;

Figure 7 is a transverse sectional view through the spatula showing the stop member;

Figure 8 is a schematic view showing how the spatula is used;

Figure 9 is a view similar to Figure 7, but showing a modified stop means;

Figure 10 is a view similar to Figure 7, but showing another modified stop means;

Figure 11 is a fragmentary plan view of the assembly of Figure 10;

Figure 12 is a fragmentary elevational view showing another modified stop means.

Referring in detail to Figures 1 through 8 of the drawings, there is shown a spatula or cake turner which includes a blade 20. The blade 20 may be fabricated of any suitable material, such as metal, and the blade 20 comprises a stationary part 21 which is relatively narrow, and a movable part 22 which is somewhat wider than the stationary part 21. The movable part 22 is hingedly connected to the stationary part 21 by hinges 23, Figure 6.

Extending rearwardly from the stationary part 21 and secured thereto, as by welding, is a rod 24. A stem 25 has one end secured, as by welding, to the movable part 22.

The rod 24 is provided with an offset portion 26, Figure 2, and the rod 24 is further provided with a loop 27. The rear end of the rod 24 is shaped to define a shank 28, and secured to the shank 28 is a handle 29.

Pivotally connected to the rear end of the stem 25 is an arm 30. The lower end of the arm 30 is provided with a coil or loop 31 which pivotally engages the rear end of the stem 25, and the loop 31 is interposed between a head 32 which is formed on the rear end of the stem 25, and a washer 33. The arm 30 also extends through the loop 27 in the rod 24.

Mounted on the upper end of the arm 30 is a thumb piece or button 34 which is adapted to be engaged by the user's finger when a hamburger, pancake or other article of food is to be turned over, and circumposed on the arm 30 is a coil spring 35. The spring 35 is interposed between the finger piece 34 and the loop 27 for normally urging the movable part 22 into a horizontal position.

A stop means is provided for limiting upward swinging movement of the movable part 22. This stop means comprises a flange 36 which is secured to the stationary part 21, and the flange 36 engages or overlies a portion of the stationary part 22 so as to prevent or limit upward swinging movement of the stationary part 22.

In Figure 8, the spatula is shown being used for turning over an article of food, such as a hamburger H. Thus, the movable part 22 is pivoted by means of the finger piece 34, the spatula being arranged above the skillet, whereby the hamburger H will turn over as it falls by gravity into the skillet.

Referring to Figure 9, there is shown a transverse sectional view of a modified stop means for the spatula. Thus, in Figure 9, hinges 37 are secured to the lower surface of the adjacent edges of the movable part 21 and stationary part 22. The hinges 37 serve to prevent the movable part 22 from pivoting or swinging above the stationary part 21.

Referring to Figures 10 and 11 of the drawings, there is shown another modified stop means for limiting swinging movement of the movable part 22. The stop means of Figures 10 and 11 includes a flange 38 that is secured to the stationary part 21, and also secured to the stationary part 21, but on the opposite side from the flange 38, is a finger 39, Figure 10. The flange 38 serves to prevent the movable part 22 from swinging too far in a clockwise direction, Figure 10, while the finger 39 serves to limit downward swinging movement of the movable part 22.

In Figure 12 there is shown another modified stop mechanism. Thus, in Figure 12 a pair of spaced lugs 41 and 42 are secured, as by welding, to the arm 30. The lug 41 is spaced above the loop 27, while the lug 42 is spaced below the rod 24. Thus, the loop 27 will engage the lug 41 to limit swinging movement of the movable part 22 in one direction, while the lug 42 will be engaged by the rear surface of the rod 24 to limit swinging movement of the movable part 22 in the opposite direction.

From the foregoing it is apparent that a spatula has been provided which can be used for turning over pancakes, hamburgers, fried eggs, French toast and the like. The plate 20 of the spatula consists of a stationary part 21 and a movable part 22, these two parts being connected together by hinges 23. By means of the thumb piece 34, the movable part 22 can be controlled to pivot at the hinges 23 and swing downward at an angle of approximately 90° from the stationary part 21 of the plate. The spatula of the present invention works as follows: As an example of how the spatula is used, the illustration will be confined to turning over a hamburger, such as the hamburger H in Figure 8. Ordinarily, the parts 22 and 21 lie in the same plane to form a continuous, flat, horizontal plate, and when the hamburger is to be turned over on its non-griddled side, the face or plate of the spatula is slipped under the hamburger, thereby supporting the hamburger.

Then, the spatula and hamburger are raised about three inches above or off of the skillet. The user then depresses the thumb piece 34 which causes the movable part 22 of the plate to pivot at the hinges 23 and swing downwardly. This action leaves the hamburger H unsupported, and as it falls to the griddle under the pull of gravity, it automatically flips over and lands wrong side down. By releasing the pressure on the finger piece 34, the spring 35 forces the movable part 22 of the plate upwardly to its original position so that it once again forms a continuous flat, horizontal surface with the stationary part 21.

The movable part 22 is bigger and wider in surface area than the stationary part 21, so that it will support the greater part of the weight of the object on the plate 20 of the spatula. Thus, when the movable part 22 swings downwardly on the hinges 23, it will leave the greater part of the object unsupported, thereby causing the object to fall downwardly and tend to flip over before falling onto or into the skillet. The spring 35 surrounds the arm 30, so that when the finger piece 34 is pressed downwardly, the spring 35 is compressed whereby the stem 25 is pushed slightly outwardly and then down, thus causing the movable part 22 to swing downwardly on the hinges 23. When the pressure is released from the finger piece 34, the spring 35 forces the arm 30 to shoot upwardly, thereby pulling the stem 25 and movable part 22 upwardly with it. The flange 36 extends slightly over the part 22 so that the part 22 cannot be raised above the horizontal plane and level of the stationary part 21.

The spatula of the present invention is easy to use and there is no wasted motion. It will turn objects accurately and place the object exactly in the desired spot, and further, there is less chance of the object slipping off before it is turned over. The plate of the spatula can be wide, angular or narrow, and the plate can be "broken" lengthwise, crosswise, or at an angle, although it is preferable to hinge the plate lengthwise as shown in the drawings. Also, the spatula can be made of any suitable material, and the plate of the spatula can be made with or without holes for drainage and with or without surface traction. The stop mechanism of Figures 10 and 11 prevent the movable part 22 from swinging more than 90° when the thumb piece 34 is actuated.

I claim:

1. In a spatula, a blade including a stationary part and a movable part hingedly connected to said stationary part along one longitudinal edge thereof so that both of said parts will lie in side-by-side relationship in load-engaging position, a stem connected to said movable part, a rod connected to said stationary part, an arm arranged at right angles with respect to said stem and pivotally connected to said rod, and a handle secured to the rear end of said rod.

2. In a spatula, a blade including a stationary part and a movable part hingedly connected to said stationary part along one longitudinal edge thereof so that both of said parts will lie in side-by-side relationship in load-engaging position, a stem connected to said movable part, a rod connected to said stationary part, an arm arranged at right angles with respect to said stem and pivotally connected to said rod, a handle secured to the rear end of said rod, and a finger-engaging piece secured to the upper end of said arm.

3. In a spatula, a blade including a stationary part and a movable part hingedly connected to the stationary part along one longitudinal edge thereof so that both of said parts will lie in side-by-side relationship in load-engaging position, a stem connected to said movable part, a rod connected to said stationary part, an arm arranged at right angles with respect to said stem and pivotally connected to said rod, a handle secured to the rear end of said rod, a finger-engaging piece secured to the upper end of said arm, and a coil spring circumposed on said arm.

4. The apparatus as described in claim 3, and further including stop means for limiting swinging movement of said movable part.

5. In a spatula, a blade comprising a narrow stationary part and a wide movable part hingedly connected to said stationary part along one longitudinal edge thereof so that both of said parts will lie in side-by-side relationship in load-engaging position, a stem having one end connected to said movable part and projecting rearwardly therefrom, a rod having one end connected to said stationary part and provided with an offset portion, said rod being provided with a loop, a handle secured to the rear end of said rod, an arm having its lower end pivotally connected to the rear end of said stem, a finger-engaging piece mounted on the upper end of said arm, and a coil spring circumposed on said arm and interposed between said finger-engaging piece and loop.

6. The apparatus as described in claim 5, and further including a stop means for limiting swinging movement of said movable part.

ROY S. BLACKSHEAR.

REFERENCES CITED

The following references are of record in the file of this patent:

UNITED STATES PATENTS

| Number | Name | Date |
| --- | --- | --- |
| 288,280 | Timoney et al. | Nov. 13, 1883 |
| 637,908 | Vroman | Nov. 28, 1899 |
| 2,397,665 | Hindle et al. | Apr. 2, 1946 |